G. W. R. HARRIMAN.
WATERWAY CHART.
APPLICATION FILED DEC. 18, 1920.
1,429,285. Patented Sept. 19, 1922.
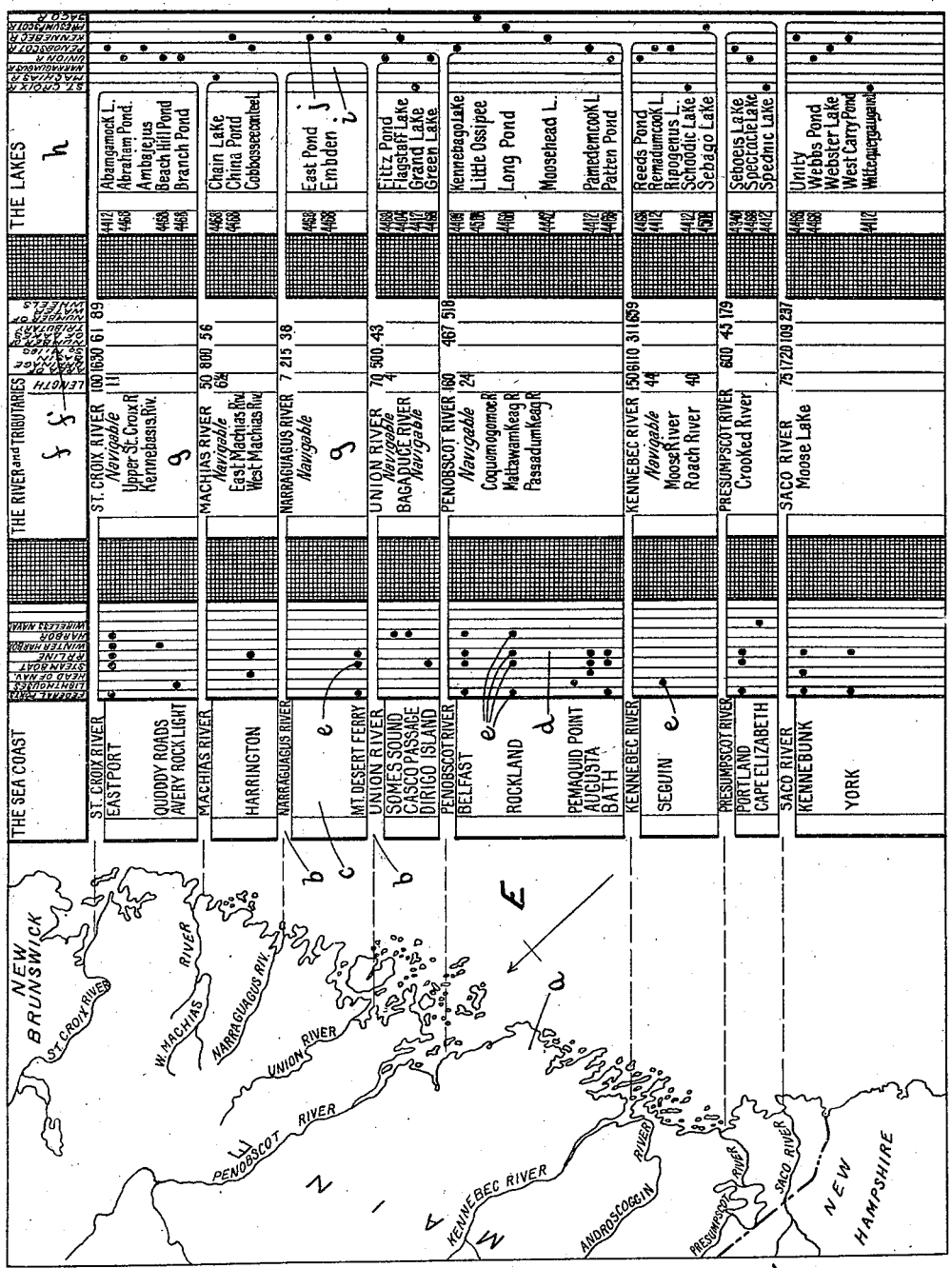
INVENTOR
George W. R. Harriman
by Wright, Brown, Quinby & May
att'ys.

Patented Sept. 19, 1922.

1,429,285

UNITED STATES PATENT OFFICE.

GEORGE W. R. HARRIMAN, OF MALDEN, MASSACHUSETTS.

WATERWAY CHART.

Original application filed June 23, 1916, Serial No. 105,524. Divided and this application filed December 18, 1920. Serial No. 431,647.

*To all whom it may concern:*

Be it known that I, GEORGE W. R. HARRIMAN, a citizen of the United States, residing at Malden, in the county of Middlesex and State of Massachusetts, have invented new and useful Improvements in Waterway Charts, of which the following is a specification.

The object of the invention is to provide a chart expressing in a graphic manner facts concerning water ways and other bodies of water in their relation to the uses of commerce, industry and recreation. Said chart is intended, among other objects, to furnish accurate and related facts expressed in logical and orderly sequence which has value as a means for giving information relative to the shipment of goods, as a means of education generally, and for other uses.

The particular embodiment of the invention presented for illustration exhibits, in map form, a selected length of sea coast and shows in a diagrammatic manner in connection with such map selective facts concerning the sea coast, the rivers which enter the sea in the selected length of coast, and the tributary rivers and lakes connected with those rivers.

The subject-matter here presented was described and illustrated in my prior application filed June 23, 1916, Serial No. 105,524, and the present application is a division of said prior application.

The single figure of the drawing shows the essential elements of the chart above briefly described. At one end there is a map $a$ of sea coast, preferably drawn correctly to scale with the features of the map in their correct relation to one another, whereby said map is adapted to serve the ordinary uses of any map, having regard to the scale on which it is drawn. Said map shows clearly the locations of rivers which empty into the sea in the section of sea coast where plotted.

In the next adjacent part of the chart channels $b$, $b$ are defined between parallel lines, and such channels are preferably spaced apart by distances generally proportional to the distance on the map between the mouths of said rivers. Between said channel indications are enclosed spaces or boxes $c$ in which are noted the salient features of the coast between the river mouths and of the shores of the rivers; such as towns, important islands, points of land, harbors, etc. Besides the enclosures which contain the names last referred to are columns $d$ which are set apart for the indication of facts concerning the various localities so named.

For the purpose of the protection which I here seek, it is not important what the specific facts or information last referred to may be, other than that the information is of value or interest to mariners, shippers, or travelers, or for educational purposes. I have designated illustratively by legends applied adjacent to the heads of the respective columns what the nature of this information may be. Points $e$ plotted in the appropriate columns beside the location names then show graphically such of the facts included within the chart as concern or are pertinent to the places named. Thus, for illustration, the point $e$ plotted beside the name Seguin shows by reference to the head of the column in which this plot occurs that a lighthouse is established there, and the corresponding points beside the name Rockland shows respectively that Rockland is a Federal port, that it is served by both steamship and railroad lines and that it contains a harbor.

Another column $f$ contains the names of rivers tributary to those to which the channels $b$ are respectively appropriated; and the names of such tributaries are grouped according to the rivers into which they respectively empty, and are contained in spaces $g$ into which the channels $b$ open, but which are otherwise closed. Other columns $f'$ beside the column $f$ give facts of any desired nature concerning the said rivers and tributaries. Still another column $h$ contains a list of the lakes and ponds lying in the selected territory and said list is preferably arranged alphabetically, that is, in an orderly sequence enabling names to be easily found when sought for. In connection with this list there is provided means for showing the rivers fed by the various lakes, such means consisting of columns $i$, each appropriated to one of the selected rivers and appropriately designated by a legend at the head of the column. Points $j$ plotted in the columns $i$ beside the names in the column $h$ identify the rivers and ponds which communicate with one another.

The particular rivers to which the columns $i$ shown on this chart relate are the same rivers which have the respective channels $b$ and said channels are, therefore, carried on and joined into the corresponding columns, thus furnishing a means additional to the names at the heads of the columns $i$ for identifying said columns.

It will be understood that any other facts pertinent to the sea coast, rivers and lakes than those particular ones here illustrated may be set forth in an equivalent chart, within the scope of my invention; and further that my protection is not restricted to the combination of all of the elements shown in this drawing in one chart. Thus, for example, the chart does not require the map $a$ to make it complete but may be plotted and published without such map or any equivalent thereof. All information essential to the purposes of this instrument which is given by the map, is given, and other information besides, by the columns $c$, $d$, $f$, $g$, $h$ and $i$ and the points plotted therein.

What I claim and desire to secure by Letters Patent is:

1. A geographical chart comprising a tabulation of lakes and rivers and having elongated approximately parallel bounded spaces in a sequence corresponding to the geographical locations of the rivers in the territory treated in the chart, a column of names of lakes arranged in a conventional order, and branches from said spaces extending parallel to said column of names and having in them designating marks opposite the names of lakes which respectively feed said rivers.

2. In a geographical compilation, a tabulation of water ways comprising a series of narrow bounded spaces corresponding to rivers in the territory treated in the compilation, spaced in general proportion to the geographical locations of the rivers, and a column of names of tributaries of such rivers grouped in bounded spaces adjacent to and connecting with the spaces designating the several rivers.

3. In a geographical compilation, a chart containing the names of features of the sea coast of the region treated in such chart, said names being arranged in an orderly geographical sequence, and a series of column spaces beside said name column, said spaces having at their heads respective legends designating the facts to be set forth, and containing marks beside the respective names, so placed as to indicate facts concerning said places.

4. A geographical chart comprising a series of approximately parallel narrow spaces or channels distinctively designated by the names of rivers existing in the territory treated in such chart and a column of names of the tributaries to said rivers grouped adjacent to said channels and each group being comprised in a bounded space into which one of the channels opens, the names so grouped in any one space being the names of streams tributary to the river whose channel is connected with such space.

5. In a chart of rivers and lakes, a series of names of lakes arranged in predetermined order, and column spaces extending beside such series of columns, said column spaces being designated with the names of rivers and containing marks opposite to the names of lakes which feed such rivers.

6. A sea coast chart having a column of names of features of the coast treated in such chart arranged in geographical order and having beside said name column a series of parallel columns individually designated in terms of facts appertaining to the points or locations designated by such columns, said columns containing indication points opposite to the names of the places to which the facts designated by the columns respectively appertain.

7. A chart containing a series of channel indications designated by the names of rivers in the territory treated in said chart and arranged in approximate correspondence with the geographical order of such rivers, and having a column extending transversely to said series of channels in which are located names of places located on one of the said rivers, the chart having also beside the said name column a series of columns substantially parallel thereto and individually designated in terms of facts appertaining to the places of which the names are contained in the said name column, said latter columns also containing indication points opposite to the names of the places to which said facts, respectively, appertain.

8. In a geographical compilation, a chart containing in one column the names of features of a selected section of sea coast and including in such column the names of rivers emptying into the sea, such names being arranged approximately in the order of their geographical locations, the names of the rivers being spaced approximately according to the geographical locations of their mouths, boundary lines embracing the names of the rivers and extending beyond said column, a second column in which the names of tributaries of said rivers are arranged in groups adjacent the channel spaces between said boundary lines, each group of tributary names including the tributaries of the river adjacent to whose channel indication such group is placed, and a third column including the names of lakes arranged in order convenient for reference; the river spaces being carried through said third column and branched beyond the same in channels parallel to said column and containing designation marks beside the names of those lakes which feed the several rivers.

In testimony whereof I have affixed my signature.

GEORGE W. R. HARRIMAN.